United States Patent [19]

Robinson

[11] 4,291,532

[45] Sep. 29, 1981

[54] FUEL SUPPLY SYSTEM

[75] Inventor: Keith Robinson, Churchdown, England

[73] Assignee: Dowty Fuel Systems Limited, Cheltenham, England

[21] Appl. No.: 45,851

[22] Filed: Jun. 5, 1979

[30] Foreign Application Priority Data

Mar. 23, 1979 [GB] United Kingdom ............... 10666/79

[51] Int. Cl.³ .............................................. F02C 9/08
[52] U.S. Cl. ................................. 60/223; 123/198 D; 60/39.06
[58] Field of Search .................... 60/223, 39.29, 39.06, 60/39.28; 123/198 D, 198 DB

[56] References Cited

U.S. PATENT DOCUMENTS

| 2,617,477 | 11/1952 | Isreeli | 158/36 |
| 2,851,857 | 9/1958 | Jones | 60/39.28 |
| 3,293,847 | 12/1966 | Rogers | 60/223 |
| 3,937,588 | 2/1976 | Kisslan | 60/223 |

Primary Examiner—Charles J. Myhre
Assistant Examiner—Carl Stuart Miller
Attorney, Agent, or Firm—Young & Thompson

[57] ABSTRACT

This invention relates to a fuel supply system for an engine having a main fuel flow scheduling device, an auxiliary fuel flow scheduling device, a power demand adjuster operative to adjust both scheduling device, and a failure detector capable of detecting failure of the main scheduling device and of making the auxiliary scheduling device operative to control fuel flow to the engine following such failure. In the past, fuel systems of this kind have given an abrupt change of fuel flow on changeover to the auxiliary scheduling device giving the possibility of damage to the engine and danger to human life.

In the present invention a metering valve 201 forms part of the auxiliary scheduling device 201, 246, 209, 221, 222, 231, 232, 233, 234 for continuous adjustment of the flow to the engine permitted by the main scheduling device 184. Whenever the auxiliary scheduling device begins to control fuel flow, the flow remains constant at the instant of changeover at the value determined by the main scheduling device just prior to the changeover.

The auxiliary scheduling device may be arranged for slow self-variation after the changeover to alter the relation between fuel flow to the engine and the setting of the power demand adjuster.

11 Claims, 2 Drawing Figures

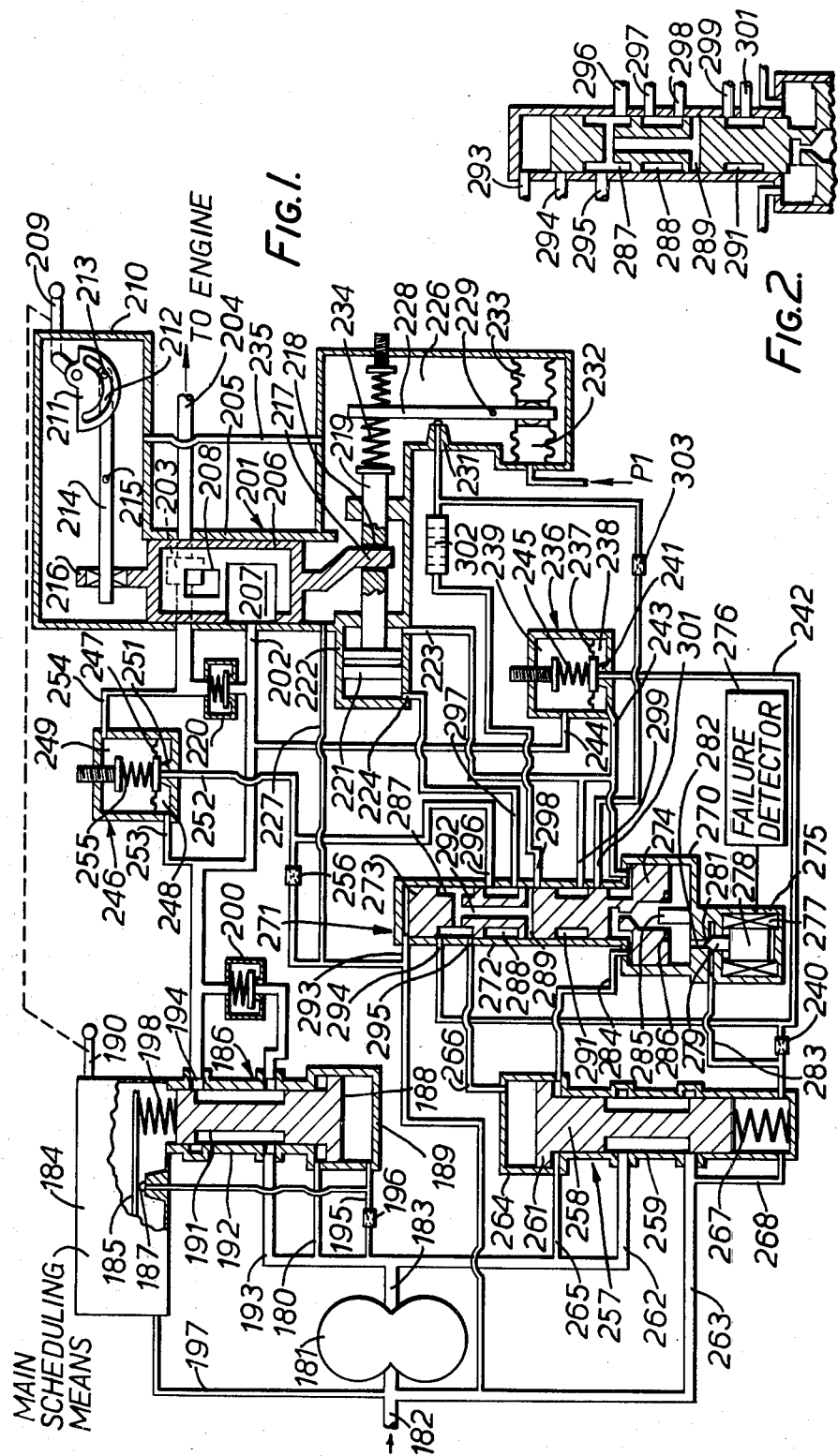

FUEL SUPPLY SYSTEM

The invention in this application is related to the invention disclosed in application Ser. No. 952,254, filed Oct. 17, 1978, and both applications are assigned to a common assignee.

This invention relates to a liquid fuel supply system for use, for example, with an engine.

A liquid fuel supply system for an engine may be of an exceedingly complicated nature to control the engine accurately in compliance with at least a power demand signal and with or without operational factors dependent on the conditions of operation of the engine. The power demand signal may be provided by a manually operable control or an automatic control for selecting engine power. The operational factors may be engine speed, engine air inlet temperature and engine air inlet pressure. Failure of a liquid fuel supply system to supply fuel accurately can result in failure of the engine to operate correctly and, in turn, this may result in damage and danger to human life.

It is known to provide a liquid fuel supply system for an engine which comprises two separate fuel scheduling means, and a variable delivery pump for each scheduling means, the two pumps being connected together to provide a single fuel delivery which passess successively through the two scheduling means to the engine. The two scheduling means each have controlling valves for adjusting fuel pump delivery, such controlling valves normally being connected in parallel. If there is a failure, an isolating valve is closed either automatically or by an operator to isolate the pump controlling valves from one another, whereby one scheduling means and its associated pump may continue to supply fuel accurately to the engine.

In this known arrangement the two scheduling means operate in accordance with a manual power demand signal and differing operational factors of the engine, and do not always schedule the same fuel flow rates for the engine, the normal arrangement of parallel connection of the controlling valves resulting in fuel flow to the engine which is the minimum of the two scheduled flows. If a failure of one scheduling means occurs and the isolating valve is closed, the fuel flow could change abruptly resulting in sudden change in engine performance which could produce danger. The object of this invention is to provide a liquid fuel supply system having a main and an auxiliary fuel scheduling means in which only the main scheduling means normally determines fuel flow to the engine and in which, if there is a failure of the main scheduling means, then there is an automatic changeover to the auxiliary scheduling means which does not involve an abrupt change of fuel flow at the instant of changeover.

In accordance with the present invention a liquid fuel supply system includes:
(a) a source of fuel under pressure,
(b) a fuel outlet,
(c) flow adjusting means for adjusting fuel flow from the source to the outlet,
(d) a main fuel flow scheduling means normally controlling said flow adjusting means,
(e) an auxiliary fuel flow scheduling means, comprising:
  (i) a metering valve having overlapping metering ports through which fuel flows to the outlet, the area of overlap being adjustable by a length movement and a width movement,
  (ii) pressure drop responsive means responding to pressure drop at the metering valve to adjust said area of overlap by one of said movements to tend to maintain a constant pressure drop across the metering valve,
(f) a power demand adjuster connected to adjust the main scheduling means and also connected to adjust the said area of overlap of the metering valve ports by the other of said movements.
(g) a failure detector responsive to failure of the main scheduling means to cause the auxiliary scheduling means to begin to control the flow adjusting means by connecting the pressure drop responsive means in substitution for the main flow scheduling means to adjust the flow adjusting means in the sense to maintain a constant pressure drop at the said metering valve ports.

IN THE DRAWING

FIG. 1 is a diagrammatic illustration of one embodiment of the invention, and,

FIG. 2 is a view of the logic valve of FIG. 1 in its emergency position.

Reference is now made to the accompanying drawing. The source of liquid fuel into the system is a gear pump 181 which takes fuel from a low pressure supply 182 and pumps it to the high pressure delivery 183. A main fuel flow scheduling means 184 receives signals from a manually operable power demand adjuster 190 and from operational factors of the engine such as speed, air inlet temperature and air inlet pressure, and will determine a desired fuel flow which is signalled as a force on a lever 185. Lever 185 controls a throttle valve 186 through the medium of a servo vent 187 and a differential area servo piston 188, slidable in a cylinder 189. The throttle valve comprises a waisted piston 191 movable in a cylinder 192 by means of piston 188 to vary the throttle effect between inlet port 193 and outlet port 194. Inlet port 193 receives fuel from the pump deivery 183. The smaller area of servo piston 188 is acted upon by fuel at pressure from delivery 183 through pipe 180 while the larger area of piston 188 is acted upon by a reduced pressure fed from port 195. Such reduced pressure is determined by the flow of fuel to low pressure permitted by vent 187 through a restrictor 196 from pump delivery 183. The interior of the main scheduling means 184 is vented to the low pressure pipe 182 by pipe 197 to carry away flow from vent 187 and to maintain a low pressure at the end of waisted piston 191 exposed to the interior of the scheduling means 184. A feed back spring 198 acting between the end of waisted piston 191 and a lever 185 ensures proportionality between the force exerted on lever 185 by scheduling means 184 and the position of piston 191. A by-pass valve 200 connected between inlet port 193 and outlet port 194 ensures flow of fuel to port 194 if the piston 191 seizes in a near-closed position.

The auxiliary fuel flow scheduling means includes a metering valve 201 having a fuel inlet port 202 and an outlet port 203 from which fuel outlet 204 leads to the engine. Fuel from outlet port 194 of throttle valve 186 enters inlet port 202. Ports 202 and 203 are formed in the wall of a cylinder 205 and flow between these ports is controlled by a hollow piston 206 slidable and rotatable in cylinder 205. Piston 206 has a large port 207 to connect its hollow interior to port 202 over the whole range of sliding and rotation of piston 206. Port 203 in cylinder 205 is of rectangular form for co-operation with a port 208 of similar rectangular form in the wall of hollow piston 206. Ports 203 and 208 form metering ports.

Rotation of piston 206 varies the widthwise overlap of the ports 203 and 208 while axial movement varies their lengthwise overlap. Thus the effective area of overlap of ports 203 and 208 is dependent on the product of angular and axial movement of piston 206. Axial movement of piston 206 is controlled by a manually operable lever 209 which is mechanically connected to and forms part of the power demand adjuster. Lever 209 is carried in a chamber 210 at one end of cylinder 205 and rotates a cam 211 having a slot 212 which engages a pin 213 carried by lever 214. Lever 214 is pivoted at 215 in chamber 210 and engages a connector 216 secured to the end of piston 206. Connector 216 enables angular movement of lever 214 to move piston 206 axially, but permits rotation of piston 206 independently of lever 214. Cam 211, pin 213, lever 214, and connector 216 are located within chamber 210.

Piston 206 is rotatable by a crank pin 217 which engages a hole 218 formed in a piston rod 219. Hole 218 permits axial movement of pin 217 and of piston 206. Rod 219 extends from a differential area servo piston 221, slidable in a cylinder 222. Port 223 in cylinder 222 connects high pressure fuel from pump delivery 183 to act on the smaller area of piston 221, and a port 224 in cylinder 222 connects fuel at a controlled pressure to act on the larger area of piston 221. The ratio of the two areas of piston 221 has a particular value whose significance will appear later in this specification.

The cylinder 222 is secured to one end of cylinder 205 at right-angles thereto and is secured to a chamber 226 which latter is connected through port 227 to the pump inlet 182. Within chamber 226 a lever 228 is pivotally mounted at pivot 229 and its movement will control opening of a servo vent 231. A pair of bellows 232 and 233 act oppositely on lever 228, bellows 232 receiving a pressure signal P1 from the engine while bellows 233 is evacuated. A feedback compression spring 234 acts between lever 228 and piston rod 219. Passage 235 connects chambers 210 and 226 to maintain chamber 210 at the pressure of pump inlet 182. Bypass valve 220 is connected between ports 202 and 203 to permit fuel flow in the event that piston 206 becomes seized in the near-closed position.

A first servo valve 236 responds to the pressure drop of fuel passing through valve 186 to produce a first control pressure. The valve 236 comprises a chamber across which a flexible diaphragm 237 extend dividing the chamber into parts 238 and 239. Within part 238 a valve seat 241 co-operates with the diaphragm to control flow of fuel to port 242. A port 243 opens into chamber part 238 carrying fuel at pressure from pump delivery 183 and a port 244 opens into chamber part 239 carrying fuel at pressure from outlet port 194 of valve 186. Adjustable spring loading 245 in chamber part 239 acts on diaphragm 237 in the sense to oppose diaphragm force due to the pressure difference on its opposite sides. Port 242 is fed through restrictor 240 from pump inlet 182. For a predetermined pressure difference between ports 243 and 244 the spring load 245 equals the pressure force on the diaphragm causing a controlled movement of the diaphragm from seat 241 and thus generating a controlled flow from port 243 to port 242. This controlled flow, in passing through restrictor 240, generates the variable first control pressure in port 242. This first control pressure is dependent on the pressure drop of fuel flowing through valve 186.

A second servo valve 246 identical with valve 236 responds to the pressure drop of fuel passing through metering valve 201 to produce a second control pressure. The valve 246 comprises a chamber across which a flexible diaphragm 247 extends dividing the chamber into parts 248 and 249. Within part 248 a valve seat 251 cooperates with the diaphragm to control flow of fuel to a port 252. A port 253 opens into chamber part 248 carrying fuel at pressure from inlet port 202 of valve 201, and a port 254 opens into chamber part 249 carrying fuel at pressure from outlet port 203 of metering valve 201. Adjustable spring loading 255 in chamber part 249 acts on diaphragm 247 in the sense to oppose diaphragm force due to the pressure difference on its opposite sides. Port 252 is fed through restrictor 256 from pump inlet 182. For a predetermined pressure difference between ports 253 and 254, the spring load 255 equals the pressure force on the diaphragm causing a controlled flow from port 253 to port 252. This flow passes through restrictor 256 to the pump inlet 182 and will generate the variable second control pressure at port 252. This second control pressure is dependent on the pressure drop of fuel flowing through metering valve 201.

The fuel flow adjusting means is a valve means or spill valve 257 which comprises a waisted piston 258 movable in a cylinder 259 by means of differential area servo piston 261 to vary the throttle effect between an inlet port 262 and an outlet port 263. Port 262 receives fuel at pressure from pump delivery 183 and port 263 is connected back to the pump inlet 182. Servo piston 261 moves in cylinder 264, fuel at high pressure being supplied through port 265 from pump delivery 183 to act on the smaller piston area. A controlled presure acts on the larger area of piston 261 through port 266. The end of the cylinder 259 remote from piston 261 contains a compression spring 267 to ensure closure of valve 257 when the system is inoperative. This end of cylinder 259 is connected by port 268 with pump inlet 182. The position taken up by piston 258 in dependence on the control pressure will determine the amount of fuel from pump delivery 183 which is spilled back to pump inlet 182 and will thus determine the quantity of fuel from the delivery 183 which passes through the outlet 204 to the engine.

A two-position logic valve 271 connects the system either for normal operation using the main scheduling means or for emergency operation on occurrence of failure of the main scheduling means. The logic valve comprises a cylinder 272, a multiple waist piston 273 slidable within the cylinder, a differential area servo piston 274 secured to piston 273 and servo cylinder 270 secured to cylinder 272, the servo piston 274 being slidable in servo cylinder 270. A solenoid valve 275 is secured to cylinder 270. A failure detector 276 is responsive to failure of the main scheduling means 184, its manner of operation being irrelevant to the present invention. Within the solenoid valve 275 a solenoid 277 acts on an armature 278 which, in turn, controls movement of a needle valve 279 relative to a seat 281. Energization of solenoid 277 from the failure detector 276 causes needle valve 279 to engage its seat 281. Seat 281 is formed in a passage 282 opening into cylinder 270 adjacent the larger area of piston 274. The other end of passage 282 connectsj to pipe 283 which, in turn, connects back to pump inlet 182. The end of cylinder 270 adjacent the smaller area of piston 274 connects through pipe 284 to pump delivery 183. A magnetically-operated switch 285 in cylinder 270 responds to movement of a magnet 286 carried by piston 274 to signal movement of the logic valve.

The piston 273 includes four waists 287, 288, 289 and 291, the waists 287 and 289 being connected together by a central passage 292 within piston 273. In cylinder 272 there are eight axially-spaced ports 293, 294, 295, 296, 297, 298, 299 and 301. FIG. 1 shows the logic valve position for normal operation, i.e., the non-failed position, and FIG. 2 shows the logic valve for emergency operation, i.e., the failed position. Port 293 is connected to pump inlet 182. Port 294 is connected to port 242 of valve 236. Port 295 is connected to port 266 of servo cylinder 264. Port 296 is connected to port 252 of valve 246. Port 297 is connected to port 224 of cylinder 222. Port 298 is connected through a restrictor unit 302 to servo vent 231. Restrictor unit 302 is comprised by a plurality of orifices arranged in series to provide the restrictive effect of a very small orifice without the danger of obstruction by small particles of solid matter in the fuel. Port 299 is connected to receive high pressure fuel from pump delivery 183. Port 301 is connected through restrictor 303 to servo vent 231.

In normal operation of the system in FIG. 1 fuel delivered by pump 181 passes through throttle valve 186 and metering valve 201 to fuel outlet 204, a pressure drop occurring at throttle valve 186, and a further pressure drop occurring at metering valve 201. The throttle effect at valve 186 is determined by the load exerted on lever 185 which, in turn, is determined by the signals and power demand adjuster setting fed to the main scheduling means. The pressure drop at valve 186 is fed through ports 243 and 244 to act on diaphragm 237 of valve 236. At the flow rate required by the main scheduling means, the pressure drop between ports 193 and 194 will acquire a predetermined value. The ports 193 and 194 are connected to the chamber ports 238 and 239 of servo valve 236 and at this predetermined pressure the force generated on the diaphragm 237 will substantially exactly balance the force of spring 245, causing the diaphragm to acquire a controlling position relative to the seat 241 allowing flow of fuel from port 243 through port 242 and restrictor 240 and producing the first control pressure at the port 242. This first control pressure is fed to port 294 of logic valve 271. Within the logic valve this first control pressure passes through waist 287 to port 295 and on to port 266 of servo cylinder 264 of spill valve 257. The first control pressure thus acts on the larger area of servo piston 261 to move spill valve piston 258 to determine a throttled fuel flow from pump delivery 183 through ports 262 and 263 back to pump inlet 262, subtracting from the total delivery flow of fuel from pump 181 so that the remainder of the fuel passing through throttle valve 186 produces the predetermined pressure drop determined by valve 236. Thus the fuel flow to the outlet 204 is that determined by the main scheduling means.

The flow of fuel through metering valve 201 will pass through the valve opening determined by overlapping ports 203 and 208, whose overlapping area is determined as to length by the power demand adjuster 190, 209 and as to width by the setting of servo piston 221. The pressure drop occurring due to fuel flow through this overlapping area is fed through ports 253 and 254 to act on diaphragm 247 of servo valve 246, to produce a force opposing the load of spring 255. The diaphragm 247 controls flow of fuel into seat 251 and thus controls flow of fuel through restrictor 256 back to pump inlet 182. The flow through the restrictor will generate the second control pressure at port 252. This second control pressure is fed to port 296 of the logic valve and there will pass through waist 288 and port 297 to the port 224 of servo cylinder 222 to act on the larger area of piston 221 in opposition to the force of high pressure fuel acting on the smaller area of piston 221. The piston 221 will move in one or other direction to rotate piston 206 and vary the width of overlap of ports 203 and 208 until the pressure drop of fuel passing through these ports reaches a predetermined value at which the pressure drop force on diaphragm 247 exactly balances spring load 255. As fuel flow to the outlet 204 is varied by the main scheduling means, the pressure drop at the overlapping ports 203 and 208 will vary but operation of the servo piston 221 to vary the width of overlap of ports 203, 208 will act to bring the pressure drop back to the predetermined value. The area ratio for servo piston 221 is arranged to be identical to the area ratio of servo piston 261 which will ensure that the first and second control pressures for the balanced state of servo piston 261 and servo piston 221 will be identical. In normal operation ports 298 and 301 of the logic valve are maintained closed whereby servo vent 231 in chamber 226 can exert no control. For normal operation logic valve 271 is held in its FIG. 1 position by electric current fed from failure detector 276 which energizes solenoid 277 to maintain needle valve 279 on seat 281, thus ensuring that high pressure from port 284 fed through a restrictor in piston 273 may act on the larger area of logic servo piston 274. The force developed on the larger area of servo piston 274 will hold the servo piston in one extreme of its movement against high pressure from port 284 acting on the smaller area of piston 274, this being the position shown in FIG. 1.

In the event of a failure of the main scheduling means 184, the failure detector 276 will operate to switch off current to solenoid 277, thus permitting needle valve 279 to be unseated connecting low pressure from passage 282 to be effective on the larger area of logic servo piston 274. High pressure acting on the smaller area of piston 274 will then move the logic valve to the FIG. 2 position, such movement being signalled by operation of switch 285. The FIG. 2 position of the logic valve is the emergency position causing the following changes of operation to take place:

(1) The first control pressure is cut off at port 294 and port 295 is connected to receive the second control pressure from port 296. Thus the spill valve 257 is controlled to spill fuel from pump delivery 183 back to pump inlet 182 to maintain the predetermined pressure drop at metering valve 201 as determined by servo valve 246. The spill valve 271 cannot immediately alter since the steady state values of the first and second control pressures are identical, and thus the fuel flow to the engine from outlet 204 will remain constant at the instant of failure.

(2) Waist 291 will connect port 301 to port 299 thus feeding high pressure from pump delivery 183 to restrictor 303. Also waist 288 will connect port 298 to port 297, thus connecting pressure from servo vent 231 to act through restrictor 302 and port 224 on the larger area of servo piston 221. The servo vent 231 then acts as an alternative servo control to control servo piston 221 and movement of this servo piston will take place until balance of the lever 228 is obtained between the load of spring 234 and the load of the bellows 232, 233. The load of spring 234 is in proportion to the movement of servo piston 221 and the resulting width adjustment of overlap of port 203 and 208 is in proportion to the P1 pressure fed to bellows 232. In this instance P1 is the atmospheric pressure of air at the engine. The restrictor 302 is arranged to restrict fuel flow to and from port 224 so that movement of servo piston 221 to its new position of balance takes a reasonable time period, for example, thirty seconds. During this time the operator controlling the power demand adjuster will be made aware of the change by virtue of the indicator operated by switch 285 and will expect the gradual change of controlling effect.

The purpose of this gradual change is to enable the power demand adjuster to have a greater range of control of fuel flow.

(3) The control pressure from servo vent 231, when fed through restrictor 302 to act on piston 221, is very susceptible to variation by virtue of leakage, particularly at the logic valve. In order to minimize leakage at the logic valve it is arranged that zones in the cylinder 272 on either side of ports 297 and 298 are held effectively at the same control pressure as determined by valve 246. Thus control pressure from valve 246 enters the logic valve at port 296 providing one zone under control pressure, and within piston 273 this pressure is transferred to waist 289, providing another zone within the cylinder at the control pressure whereby to establish the control pressure on either side of ports 297 and 298. The equality of the area ratios of servo pistons 261 and 221 ensures that the control pressures for these pistons when they are balanced is substantially identical and thus leakage at ports 297 and 298 cannot be large.

The auxiliary fuel flow scheduling means is thus seen to be comprised by metering valve 201, servo valve 246, power demand adjuster parts 209, 211, 212, 213, 214, 215, 216, servo motor 221, 222, pin 217, lever 228, bellows 232, 233, servo vent 231 and spring 234.

In the described embodiments arrangement is made for the relation between the position of the power demand adjuster and fuel flow to be steadily altered after change-over following failure of the main scheduling means. Within the broad scope of the present invention the arrangement for such steady alteration need not be provided.

While in the described embodiments the flow adjusting means for adjusting fuel flow comprises a valve means arranged to spill flow from the delivery of the gear pump, it is within the scope of the invention to use other methods of fuel flow adjustment, for example, the fuel pump may be a variable displacement pump whose displacement is adjustable by valve means controlled by the main and the auxiliary scheduling means.

Again, alternatively, other flow adjusting means not comprising a valve means may be used for adjusting fuel flow. For example, the flow adjusting means may comprise a fixed displacement pump drivable at variable speed under electrical control. The variable speed may be derived from an electric motor or from an electrically controlled variable slip clutch. The main and the auxiliary scheduling means may then both be arranged to provide a variable electric supply for the motor or the clutch.

Again, in the described embodiment a single pump has been shown to deliver fuel but it will be appreciated that within the scope of the present invention more than one pump may be provided to cater for the possibility of failure of a pump.

The described embodiment of the invention comprises only the structure necessary for the invention. It will be appreciated that in practice the fuel system would include other conventional components arranged to provide other conventional functions for the engine.

I claim:

1. In a liquid fuel supply system including:
   (a) a source of fuel under pressure,
   (b) a fuel outlet,
   (c) flow adjusting means for adjusting fuel flow from the source to the outlet,
   (d) a main fuel flow scheduling means normally controlling said flow adjusting means,
   (e) an auxiliary fuel flow scheduling means, comprising:
      (i) a metering valve having overlapping metering ports through which fuel flows to the outlet, the area of overlap being adjustable by a length movement and a width movement,
      (ii) pressure drop responsive means responding to pressure drop at the metering valve to adjust said area of overlap by one of said movements to tend to maintain a constant pressure drop across the metering valve,
   (f) a power demand adjuster connected to adjust the main scheduling means and also connected to adjust the said area of overlap of the metering valve ports by the other of said movements,
   (g) a failure detector responsive to failure of the main scheduling means to cause the auxiliary scheduling means to begin to control the flow adjusting means by connecting the pressure drop responsive means in substitution for the main flow scheduling means to adjust the flow adjusting means in the sense to maintain a constant pressure drop at the said metering valve ports;

the improvement in which said overlapping ports are disposed in the path of fuel flow from said source of fuel to said outlet both when said main scheduling means controls said flow adjusting means and when said auxiliary scheduling means controls said flow adjusting means.

2. A liquid fuel supply system as claimed in claim 1, including alternative control means brought into operation by the failure detector on failure of the main scheduling means to maintain said one movement of the metering valve either fixed or capable only of slow adjustment.

3. A liquid fuel supply system as claimed in claim 1, wherein the flow adjusting means is a valve means.

4. A liquid fuel supply system as claimed in claim 1, wherein the power demand adjuster is a manually operable control.

5. A liquid fuel supply system as claimed in claim 1, wherein the main scheduling means is adapted to combine other signals with the setting of the power demand adjuster.

6. A liquid fuel supply system as claimed in claim 1, including a logic valve operable by the failure detector to connect the pressure drop responsive means on failure of the main scheduling means, to adjust the flow adjusting means.

7. A liquid fuel supply system including
   (a) a source of fuel under pressure, (b) a fuel outlet,
(c) flow-adjusting means for adjusting the flow of fuel from the source to the outlet,
(d) a main servo-piston-and-cylinder unit having a predetermined area ratio for operating the flow-adjusting means,
(e) main servo-vent means for operating the main servo-piston-and-cylinder unit,
(f) main fuel-flow scheduling means controlling said main servo-vent means,
(g) auxiliary fuel-flow-scheduling means comprising:
  (i) a metering valve having overlapping metering ports through which fuel flows to the outlet, the area of overlap being adjustable by a length movement and by a width movement,
  (ii) an auxiliary servo-piston-and-cylinder unit, having the said predetermined area ratio, connected to adjust the said area of overlap by one of said movements,
  (iii) pressure-drop means responsive to the pressure drop at the metering valve and
  (iv) auxiliary servo-vent means for said auxiliary servo-piston-and-cylinder unit operable by said pressure-drop responsive means to adjust the said area of overlap by said one of said movements to tend to maintain a constant pressure drop across the metering valve,
(h) a power demand adjuster connected to adjust the main fuel-flow scheduling means and also connected to adjust the said area of overlap of the metering valve ports by the other of said movements,
(i) a failure detector responsive to failure of the main fuel-flow scheduling means, and
(j) a logic valve to connect the main servo-vent means to control the main servo-piston-and-cylinder unit during normal operation of the main scheduling means and, on response of the failure detector to a failure of the main fuel-flow scheduling means, to connect the auxiliary servo-vent means to control the main servo-piston-and-cylinder unit.

8. A liquid fuel supply system as claimed in claim 7, including an alternative control means which the logic valve is arranged, on failure of the main scheduling means, to connect to control the auxiliary piston and cylinder unit to adjust the relation between the setting of the power demand adjuster on the metering valve and the fuel flow permitted to the outlet, slowly to a predetermined value.

9. A liquid fuel supply system as claimed in claim 8, including means responsive to atmospheric pressure for adjusting said predetermined value.

10. A liquid fuel supply system as claimed in claim 8, wherein said alternative control means comprises a restrictor, an alternative servo vent, and atmospheric pressure responsive means to adjust the alternative servo vent.

11. A liquid fuel supply system as claimed in claim 10, wherein said logic valve includes ports arranged so that on movement of the logic valve, on failure of the main scheduling means, the alternative servo vent is connected through the restrictor to control the auxiliary piston and cylinder unit, the zones within the logic valve adjacent said ports being connected when in the failed position to the auxiliary servo vent to minimize leakage at said ports.

* * * * *